(12) United States Patent
Kim et al.

(10) Patent No.: US 8,303,445 B2
(45) Date of Patent: Nov. 6, 2012

(54) POWER TRAIN OF HYBRID VEHICLE

(75) Inventors: Talchol Kim, Incheon (KR); Jongsool Park, Gyeonggi-do (KR); Byungsoon Min, Gyeonggi-do (KR); Changwook Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1021 days.

(21) Appl. No.: 12/274,982

(22) Filed: Nov. 20, 2008

(65) Prior Publication Data
US 2009/0312130 A1 Dec. 17, 2009

(30) Foreign Application Priority Data
Jun. 11, 2008 (KR) .................. 10-2008-0054518

(51) Int. Cl.
F16H 3/72 (2006.01)
F16H 3/44 (2006.01)
(52) U.S. Cl. ............................................ 475/5; 475/317
(58) Field of Classification Search ............... 475/5, 317
See application file for complete search history.

(56) References Cited

U.S. PATENT DOCUMENTS
| 5,980,410 | A | 11/1999 | Stemler et al. | |
| 2008/0039258 | A1* | 2/2008 | Usoro | 475/5 |
| 2008/0081722 | A1* | 4/2008 | Raghavan et al. | 475/5 |
| 2008/0103003 | A1* | 5/2008 | Sah et al. | 475/5 |

FOREIGN PATENT DOCUMENTS
| JP | 2000-108693 A | 4/2000 |
| JP | 2000-326739 | 11/2000 |
| JP | 2006-062396 A | 3/2006 |
| JP | 2006-288122 | 10/2006 |
| JP | 2006-341647 | 12/2006 |
| JP | 2006-347268 | 12/2006 |
| KR | 10-20070119762 | 12/2007 |

* cited by examiner

*Primary Examiner* — Edwin A Young
(74) *Attorney, Agent, or Firm* — Edwards Wildman Palmer LLP; Peter F. Corless

(57) ABSTRACT

Disclosed is a power train of a hybrid vehicle that includes a first, second and third planetary gear sets each having first, second and third elements; a first motor generator connected with the first element of the second planetary gear set and the first element of the third planetary gear set; a second motor generator connected with the first element of the first planetary gear set; an engine connected with the second element of the second planetary gear set and the second element of the third planetary gear set; an output shaft connected with the second element of the first planetary gear set and the third element of the second planetary gear set; a brake selectively restraining rotation of the third element of the first planetary gear set; and a clutch selectively engaging/disengaging the third element of the first planetary gear set with the third element of the third planetary gear set.

4 Claims, 6 Drawing Sheets

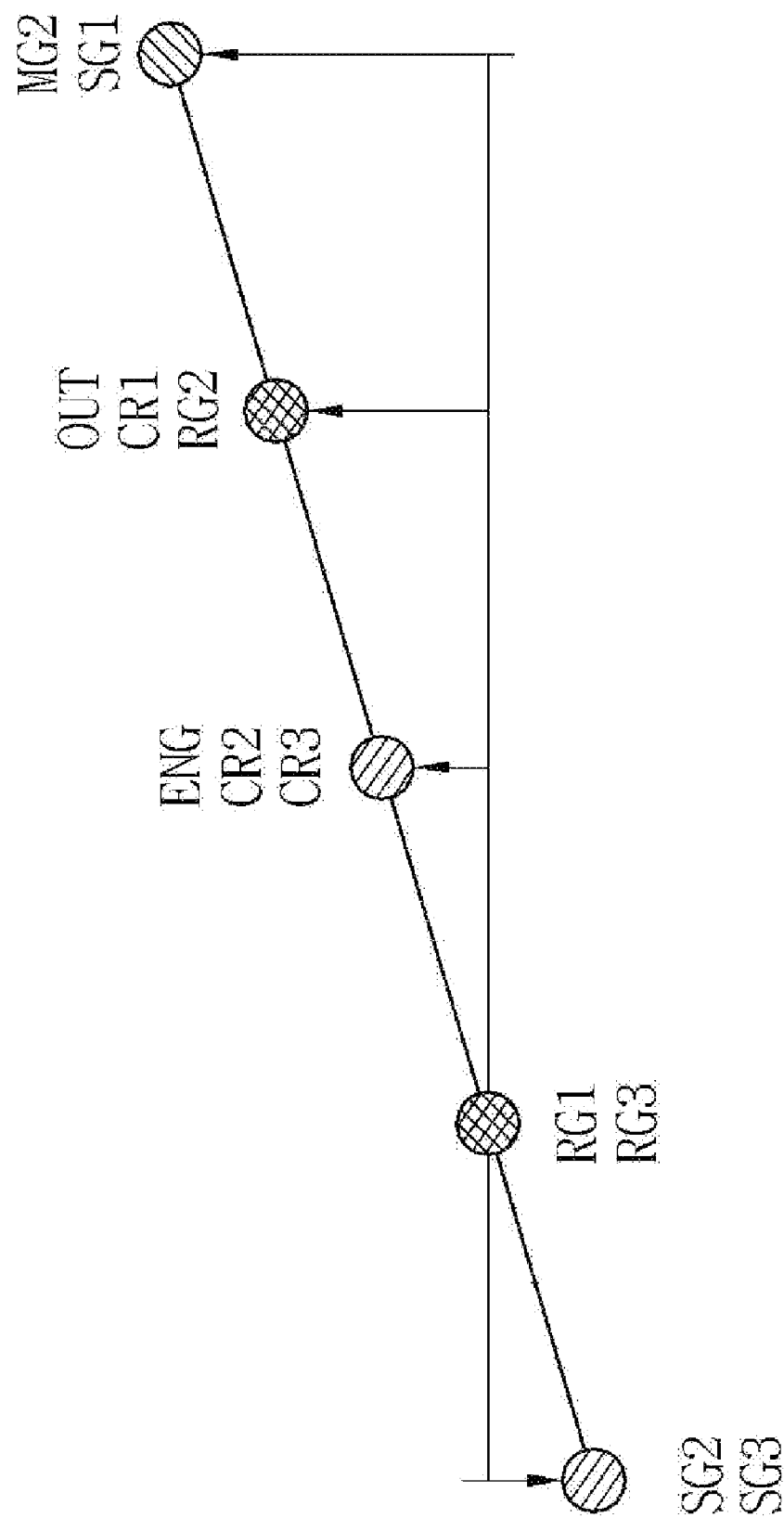

POWER TRAIN OF HYBRID VEHICLE

CROSS-REFERENCE TO RELATED APPLICATIONS

The present application is based on, and claims priority from, Korean Application Serial Number 10-2008-0054518, filed on Jun. 11, 2008, the disclosure of which is hereby incorporated by reference herein in its entirety.

TECHNICAL FIELD

The present invention relates to a power train of a hybrid vehicle, particularly a power train of a hybrid vehicle that uses an internal combustion engine and a motor generator driven by electricity as a power source providing a driving force to driving wheels.

BACKGROUND ART

Hybrid vehicles using an engine and a motor generator reduce the fuel consumption on the basis of a technology that uses, as a driving force, power from a motor generator having relatively good low-velocity torque characteristics at a low velocity and uses power from an engine having relatively good high-velocity torque characteristics at a high velocity. Further, as the hybrid vehicles do not generate exhaust gas while being driven by only the motor generator, it is environment-friendly. Techniques for reducing fuel consumption with a simpler configuration have been proposed.

The above information disclosed in this Background ART section is only for enhancement of understanding of the background of the invention and therefore it may contain information that does not form the prior art that is already known in this country to a person of ordinary skill in the art.

SUMMARY

Embodiments of the present invention provide a power train of a hybrid vehicle having simple configuration, high power performance, and reduced weight and fuel consumption, while being easily equipped in the vehicle.

A power train of a hybrid vehicle includes a first planetary gear set, a second planetary gear set, a third planetary gear set, a first planetary gear set, a second planetary gear set, and a clutch. The second planetary gear set includes three elements. The third planetary gear set includes three elements. The two of the three elements are directly connected with two elements of the second planetary gear set and connected with a first motor generator and an engine. The first planetary gear set includes three elements. One of the three elements is connected with an output shaft, and another element is connected with a second motor generator. The other element of the three is directly connected with one of the elements of the second planetary gear set and the third planetary gear set other than the elements connected with the first motor generator and the engine and is intermittently connected with the other one of the elements of the second planetary gear set and the third planetary gear set other than the elements connected with the first motor generator and the engine. The brake selectively fixes the element of the first planetary gear set other than the elements connected with the output shaft and the second motor generator. The clutch can intermittently connect the element of the first planetary gear set connected with the brake to any one of the elements of the second planetary gear set and the third planetary gear set other than the elements connected with the first motor generator and the engine.

Preferably, the first motor generator and the engine are each connected with the two elements of the second planetary gear set and the third planetary gear set, which are directly connected to each other. The output shaft is connected with an element of the first planetary gear set directly connected with an element of the second planetary gear set. The clutch intermittently connects the element of the first planetary gear set with the element of the third planetary gear set.

Preferably, the first planetary gear set is a single-pinion type planetary gear set including a first sun gear connected with the second motor generator, a first carrier connected with the output shaft, and a first ring gear connected with the brake and the clutch. The second planetary gear set is a single-pinion type planetary gear set including a second sun gear connected with the first motor generator, a second carrier connected with the engine, and a second ring gear connected with the first carrier of the first planetary gear. The third planetary gear set is a double-pinion type planetary gear set including a third sun gear connected with the first motor generator, a third carrier connected with the engine, and a third ring gear connected with the first ring gear of the first planetary gear set through the clutch.

The planetary gear sets are coaxially arranged in parallel in the order of the first planetary gear set, the second planetary gear set, and the third planetary gear set. The first motor generator is connected with the second planetary gear set through the third planetary gear set. The second motor generator is connected with the first planetary gear set. The engine is connected with the third planetary gear set through the second planetary gear set, passing through between the first planetary gear set and the second planetary gear set. The output shaft is connected with the second planetary gear set through the first planetary gear set.

The first planetary gear set, in the lever analysis diagram, is arranged on a first straight line in the order of an element connected with the second motor generator, an element connected with the output shaft, and an element connected with the brake. The second planetary gear set, in the lever analysis diagram, is arranged on a second straight line in the order of an element connected with the output shaft, an element connected with the engine, and an element connected with the first motor generator. The third planetary gear set, in the lever analysis diagram, is arranged on the second straight line in the order of an element connected with the engine, an element connected with the first planetary gear set through the clutch, and an element connected with the first motor generator, in which when the clutch is engaged, the first straight line and second straight line make a single straight line.

The elements of the planetary gear sets are arranged on the second straight line in the order of the element of the second planetary gear set connected with the output shaft, the element of the second planetary gear set and the element of the third planetary gear set connected with the engine, the element of the third planetary gear set connected with the first planetary gear set through the clutch, the element of the second planetary gear set and the element of the third planetary gear set connected with first motor generator.

The power train of a hybrid vehicle according to the invention has a simple configuration, high power performance, and reduced weight and fuel consumption, while being easily equipped in the vehicle. In particular, since an engine mode that makes it possible to drive the vehicle using only engine to reduce the fuel consumption at constant high-velocity driving, the fuel consumption in long time driving on a highway can be reduced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For better understanding of the nature and objects of the present invention, reference should be made to the following detailed description with the accompanying drawings, in which:

FIG. 6 is a lever analysis diagram illustrating the operation of the clutch and the brake in the power train of FIG. 1.

DETAILED DESCRIPTION

Embodiments of the invention are described hereafter in detail with reference to the accompanying drawings, but theses embodiments are just examples and can be achieved in various modifications by those skilled in the art. Therefore, the present invention is not limited to the embodiments.

Figure 1:
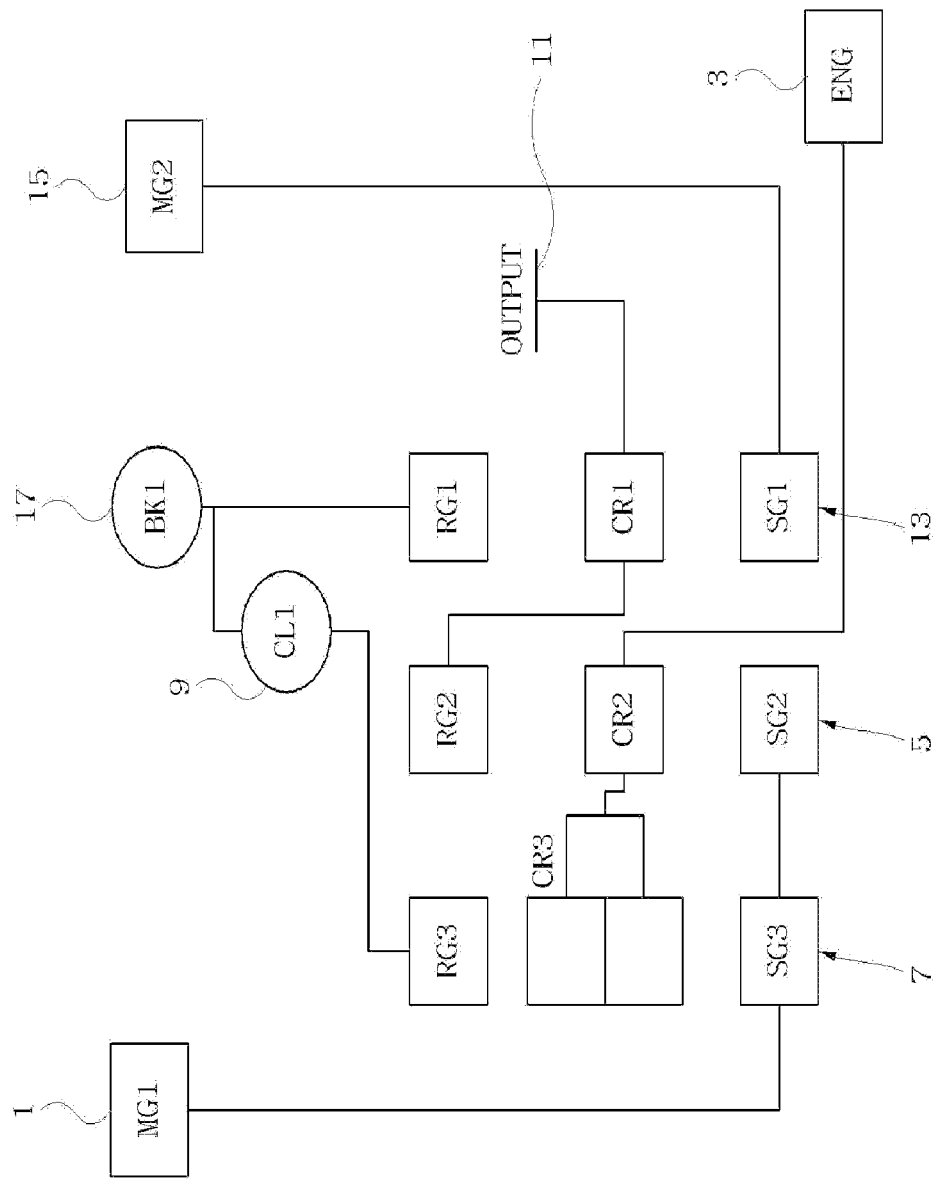
FIG. 1 is a view illustrating an example of the configuration of a power train of a hybrid vehicle according to the invention.

Referring to FIG. 1, a power train of a hybrid vehicle includes: a second planetary gear set 5 including three elements; a third planetary gear set 7 including three elements two elements of which are directly connected with two elements of the second planetary gear set 5 and connected with a first motor generator 1 and an engine 3; a first planetary gear set 13 including three elements one element of which is connected with an output shaft 11, another element of which is connected with a second motor generator 15, and the other element of which is directly connected with one of the elements of the second planetary gear set 5 and the third planetary gear set 7 other than the elements connected with the first motor generator 1 and the engine 3 and is intermittently connected with the other one; a brake 17 that selectively fixes the element of the first planetary gear set 13 other than the elements connected with the output shaft 11 and the second motor generator 15; and a clutch 9 that intermittently connects the element of first planetary gear set 13 connected with the brake 17 to any one of the elements of the second planetary gear set 5 and the third planetary gear set 7 other than the elements connected with the first motor generator 1 and the engine 3.

That is, the power train includes the three planetary gear sets 5, 7, 13, one clutch 9, and one brake 17 such that it can transmit/receive power to/from the two motor generators 1, 15, and receives power from the engine 3 and outputs shifted power through the output shaft 11.

The first motor generator 1 and the engine 3 are each connected with the two elements of second planetary gear set 5 and the third planetary gear set 7, which are directly connected to each other. The output shaft 11 is connected with an element of the first planetary gear set 13 directly connected with an element of the second planetary gear set 5.

That is, the first motor generator 1 is connected with one element of the third planetary gear set 7 and one element of the second planetary gear set 5. The engine 3 is connected with one element of the second planetary gear set 5 and one element of the third planetary gear set 7. Further, the output shaft 11 is connected with one element of the first planetary gear set 13 and one element of the second planetary gear set 5.

The first planetary gear set 13 is a single-pinion type planetary gear set, in which a first sun gear is connected with the second motor generator 15, a first carrier is connected with the output shaft 11, and a first ring gear is connected with the brake 17 and the clutch 9.

The second planetary gear set 5 is a single-pinion type planetary gear set, in which a second sun gear is connected with the first motor generator 1, a second carrier is connected with the engine 3, and a second ring gear is connected with the first carrier of the first planetary gear set 13.

The third planetary gear set 7 is a double-pinion type planetary gear set, in which a third sun gear is connected with the first motor generator 1, a third carrier is connected with the engine 3, and a third ring gear is connected with the first ring gear of the first planetary gear set 13 through the clutch 9.

In this embodiment, the planetary gear sets are coaxially arranged in the order of the first planetary gear set 13, the second planetary gear set 5, and the third planetary gear set 7. The first motor generator 1 is connected with the second planetary gear set 5 through the third planetary gear set 7. The second motor generator 15 is connected with the first planetary gear set 13. The engine 3 is connected with the third planetary gear set 7 through the second planetary gear set 5, passing through between the first planetary gear set 13 and the second planetary gear set 5. The output shaft 11 is connected with the second planetary gear set 5 through the first planetary gear set 13.

As shown in the lever analysis diagrams of FIGS. 2 to 6, the first planetary gear set 13 is arranged on a first straight line 19 in the order of an element connected with the second motor generator 15, an element connected with the output shaft 11, and an element connected with the brake 17. The second planetary gear set 5 is arranged on a second straight line 21 in the order of an element connected with the output shaft 11, an element connected with the engine 3, and an element connected with the first motor generator 1. The third planetary gear set 7 is arranged on the second straight line 21 in the order of an element connected with the engine 3, an element connected with the first planetary gear set 13 through the clutch 9, and an element connected with the first motor generator 1, in which when the clutch 9 is engaged, the first straight line 19 makes a single straight line that is synchronized with the second straight line 21.

The elements of the planetary gear sets are arranged on the second straight line 21 in the order of the element of the second planetary gear set 5 connected with the output shaft 11, the element of the second planetary gear set 5 and the element of the third planetary gear set 7 connected with the engine 3, the element of the third planetary gear set 7 connected with the first planetary gear set 13 through the clutch 9, and the element of the second planetary gear set 5 and the element of the third planetary gear set 7 connected with the first motor generator 1.

The operation in each mode of the power train of a hybrid vehicle according to an embodiment of the invention is described hereafter with reference to the lever analysis diagrams of FIGS. 2 to 6, which shows arrangement of the elements of the planetary gear sets and relative gear ratios of the elements as well.

Figure 2:
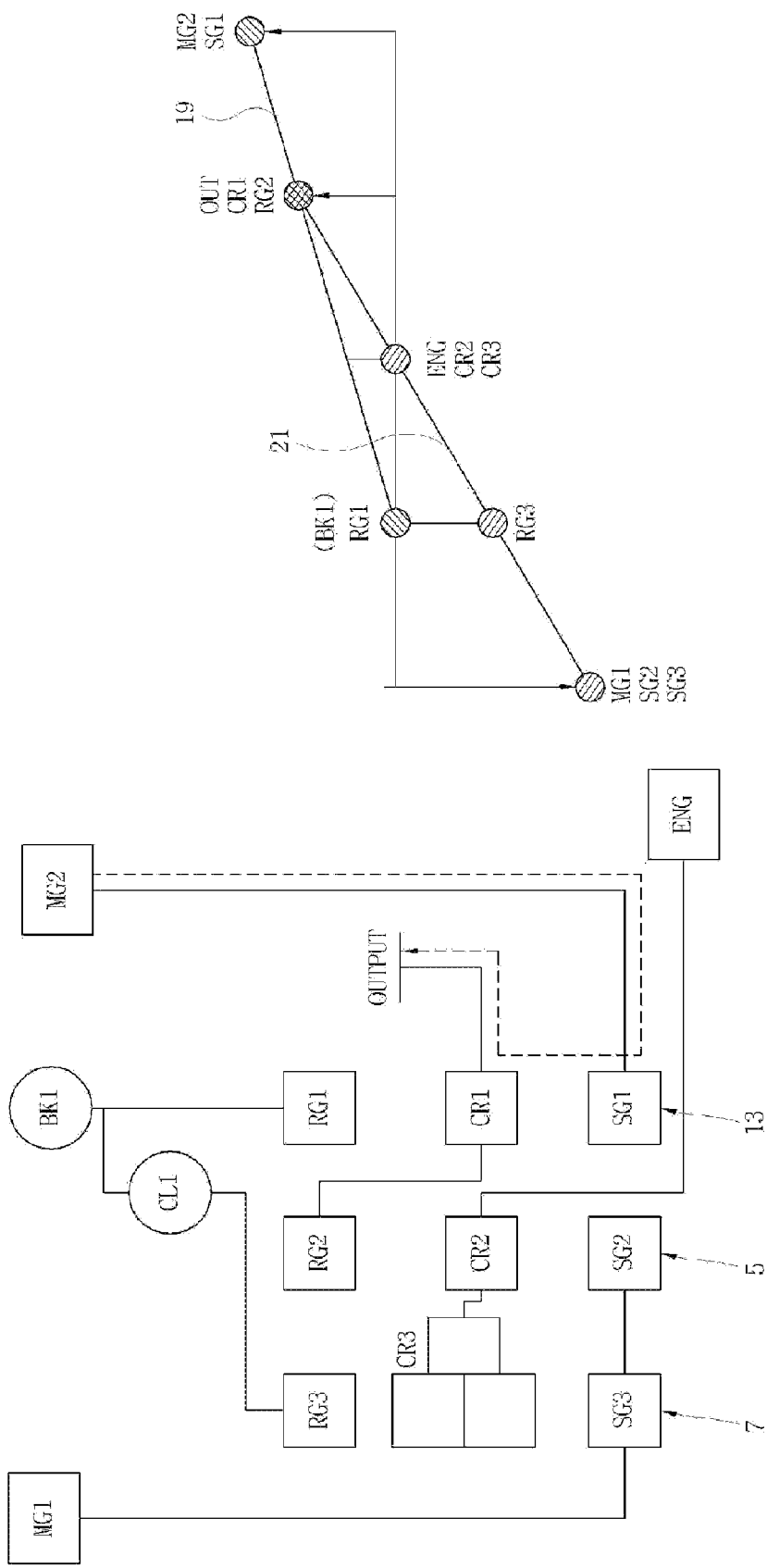
FIG. 2 shows a power flow diagram and a lever analysis diagram illustrating that the power train of FIG. 1 achieves an electric vehicle mode.

FIG. 2 illustrates an electric vehicle mode driving the vehicle using at least one motor generator while not operating an engine.

In this mode, the brake 17 is engaged such that the first ring gear is fixed, and the clutch 9 is disengaged.

As torque is generated by the second motor generator 15, power from the second motor generator 15 is transmitted to the first sun gear of the first planetary gear set 13. Since the first ring gear is fixed by the brake 17, the power from the second motor generator 15 is reduced through the first carrier and outputted to the output shaft 11.

For illustration purposes, the rotational direction of the output shaft 11 is defined as a normal direction and the opposite direction is defined as an inverse direction hereafter.

The engine 3 is stopped and connected with the second carrier of the second planetary gear set 5 and the third carrier of the third planetary gear set 7, such that the first motor generator 1 rotates in the inverse direction without torque.

Figure 3:
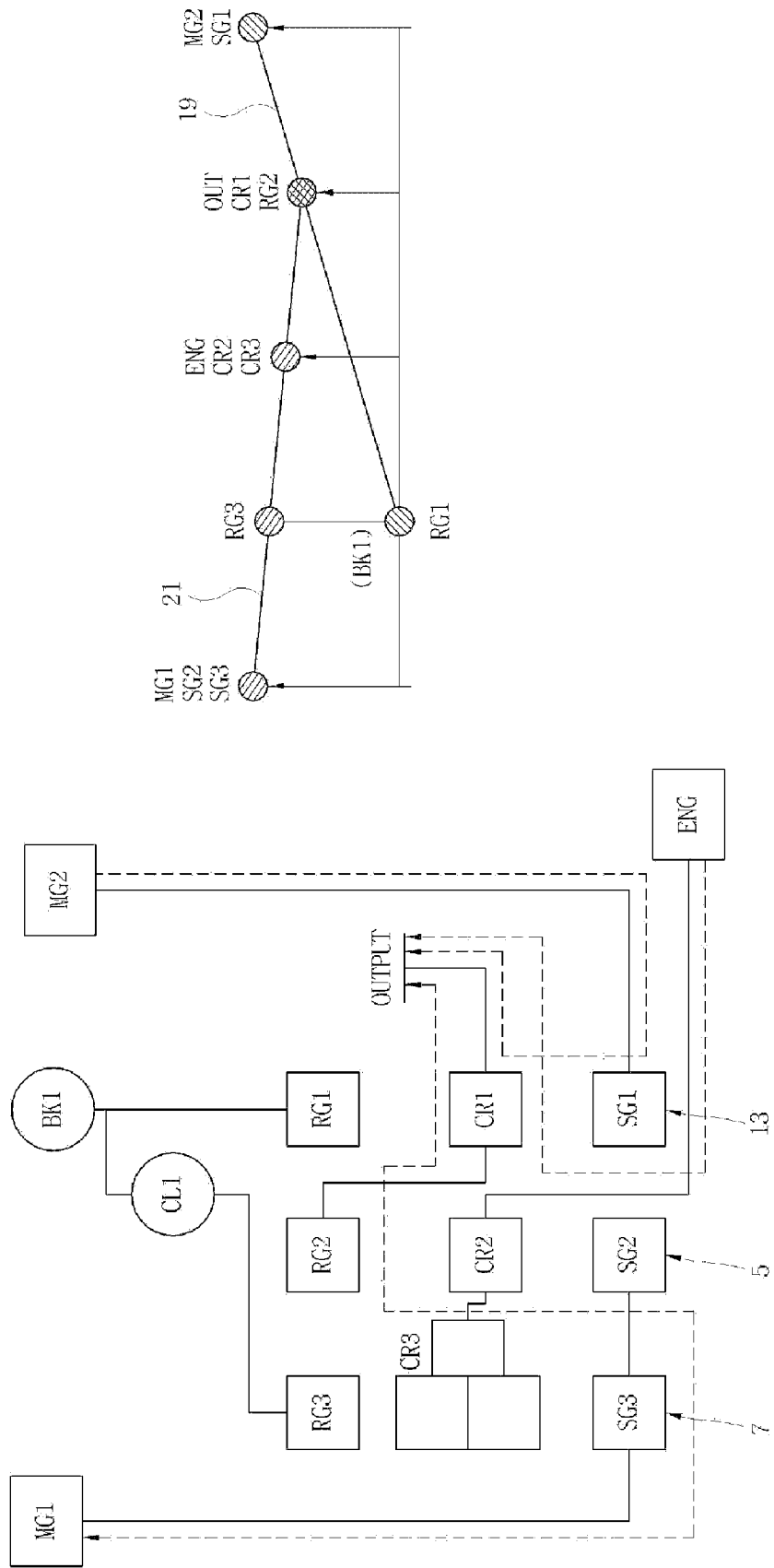
FIG. 3 shows a power flow diagram and a lever analysis diagram illustrating that the power train of FIG. 1 achieves a first hybrid mode.

FIG. 3 illustrates a first hybrid mode, in which the brake 17 fixes the first ring gear and the clutch 9 is disengaged, such that first ring gear is disengaged from the third ring gear.

As the first motor generator 1 that has rotated in the inverse direction in the electric vehicle mode is rotated in the normal direction by torque as shown in FIG. 3, the engine 3 increases in rotational velocity and can be started and generate torque, and thus power supplied from the second motor generator 15 and power supplied from the engine 3 are simultaneously outputted to the output shaft 11.

The first motor generator 1 functions as a generator that provides a reaction force according to the torque of engine 3, thereby substantially controlling the shift ratio.

The second motor generator 15 cannot control the shift ratio because the first ring gear is fixed by the brake 17, such that it only functions as a motor that transmits torque to the output shaft 11 through the first carrier.

Figure 4:
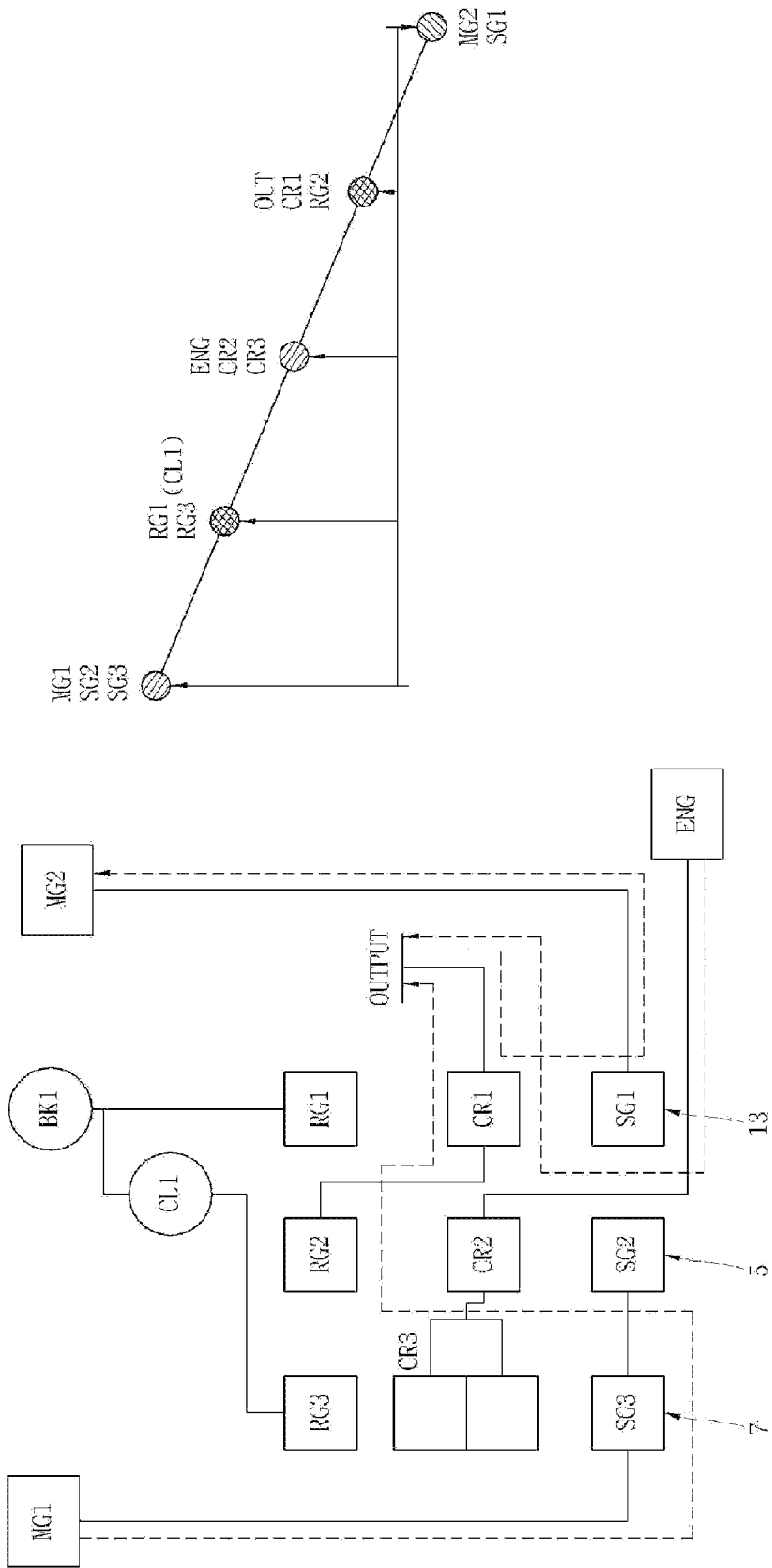
FIG. 4 shows a power flow diagram and a lever analysis diagram illustrating that the power train of FIG. 1 achieves a second hybrid mode.

FIG. 4 illustrates a second hybrid mode that is different from the first hybrid mode, which is achieved by a process involving a change from the lever condition shown in FIG. 3 to that shown in FIG. 6.

More specifically, in order to change from the first hybrid mode to the second hybrid mode, the engine 3 and the first motor generator 1 are controlled in the first hybrid mode to make the velocity of the third ring gear reach 0 as shown in FIG. 6, and then the clutch 9 is engaged and the brake 17 is disengaged.

After all of the first planetary gear set 13, the second planetary gear set 5, and the third planetary gear set 7 make a lever on a single straight line by engaging the clutch 9 as described above and the first ring gear can be rotated by disengaging the brake 17, the first motor generator 1 and the second motor generator 15 are controlled to meet the condition shown in FIG. 4, thereby achieving the second hybrid mode.

Here, the first motor generator 1 functions as a motor, rotating in the normal direction, and the second motor generator 15 functions as a generator, rotating in the inverse direction.

Figure 5:
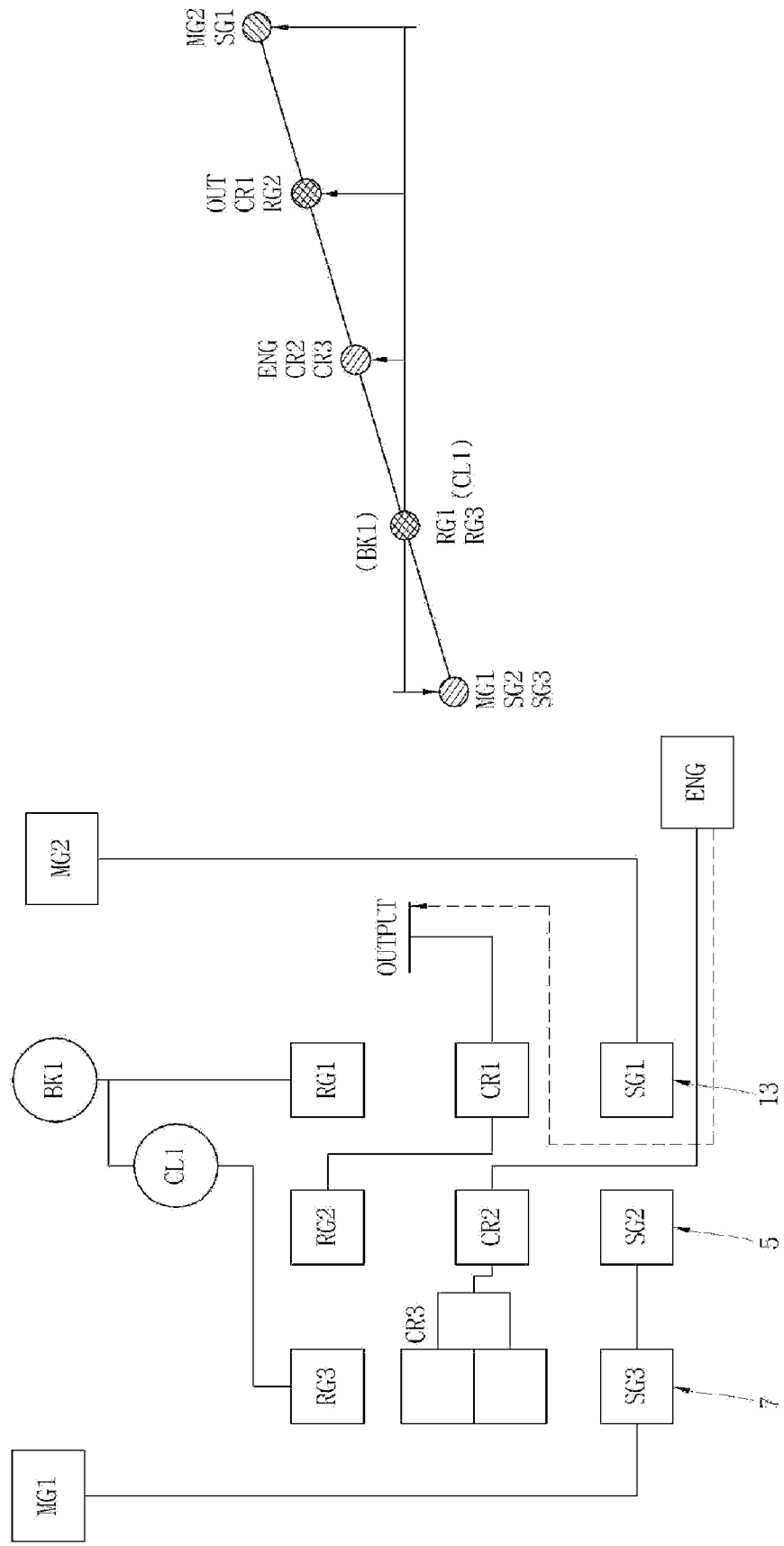
FIG. 5 shows a power flow diagram and a lever analysis diagram illustrating that the power train of FIG. 1 achieves an engine mode.

FIG. 5 shows an engine mode that can be provided by the power train of the invention.

The engine mode is achieved by controlling the shift ratio in the second hybrid mode such that the velocities of the first ring gear and the third ring gear are 0 as shown in the condition of FIG. 6, engaging the brake 17, and then removing torque of the first motor generator 1 and the second motor generator 15.

Here, the engine 3 undertakes all of the torque supplied to the output shaft 11 and an overdrive shift ratio in which the second ring gear connected with the output shaft 11 rotates at a higher velocity than the second carrier connected with the engine 3 is achieved.

Therefore, since it is possible to achieve high-velocity traveling at the overdrive shift ratio only using the engine 3, without driving the first motor generator 1 and the second motor generator 15, it is possible to reduce a significant amount of fuel consumption especially when a vehicle is traveling at a high speed for a long time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power train of a hybrid vehicle, comprising:
a first, second, and third planetary gear set each including a first, a second and a third element;
a first motor generator connected with the first element of the second planetary gear set through the first element of the third planetary gear set, the first element of the third planetary gear set directly connected to the first motor;
a second motor generator directly connected with the first element of the first planetary gear set;
an engine connected with the second element of the second planetary gear set and with the second element of the third planetary gear set;
an output shaft connected with the second element of the first planetary gear set and with the third element of the second planetary gear set through the second element of the first planetary gear set;
a brake selectively restraining rotation of the third element of the first planetary gear set; and
a clutch selectively engaging/disengaging the third element of the first planetary gear set with the third element of the third planetary gear set.

2. The power train as defined in claim 1, wherein:
at least one of the first, second and third planetary gear sets is a double-pinion type planetary gear set and the other planetary gear sets are a single-pinion type planetary gear set.

3. The power train as defined in claim 2, wherein:
the first planetary gear set is a single-pinion type planetary gear set and the first, second and third elements are a first sun gear, a first carrier, and a first ring gear, respectively;
the second planetary gear set is a single-pinion type planetary gear set and the first, second and third elements are a second sun gear, a second carrier, and a second ring gear, respectively; and the third planetary gear set is a double-pinion type planetary gear set and the first, second and third elements are a third sun gear, a third carrier, and a third ring gear, respectively.

4. The power train as defined in claim 3, wherein:

the first, second and third planetary gear sets are coaxially arranged in parallel in the order of the first planetary gear set, the second planetary gear set, and the third planetary gear set;

the first motor generator is connected with the second planetary gear set through the third planetary gear set;

the engine is connected with the third planetary gear set through the second planetary gear set, passing between the first planetary gear set and the second planetary gear set; and the output shaft is connected with the second planetary gear set through the first planetary gear set.

* * * * *